United States Patent [19]

Jaaskelainen, Jr.

[11] Patent Number: 5,963,191

[45] Date of Patent: Oct. 5, 1999

[54] METHOD AND SYSTEM FOR DENYING GRAPHICAL POINTER ACCESS TO A WIDGET OF A DATA PROCESSING SYSTEM GRAPHICAL USER INTERFACE

[75] Inventor: William Jaaskelainen, Jr., Austin, Tex.

[73] Assignee: International Business Machines Corporation, Armonk, N.Y.

[21] Appl. No.: 08/824,561

[22] Filed: Mar. 25, 1997

[51] Int. Cl.⁶ ............................................. G06F 3/00
[52] U.S. Cl. ...................... 345/145; 345/339; 345/977; 345/348
[58] Field of Search .................. 345/326–358, 345/145, 146, 977

[56] References Cited

U.S. PATENT DOCUMENTS

| | | | |
|---|---|---|---|
| 4,857,903 | 8/1989 | Zalenski | 340/710 |
| 4,859,995 | 8/1989 | Hansen et al. | 345/340 |
| 4,908,612 | 3/1990 | Bromley et al. | 340/706 |
| 4,987,411 | 1/1991 | Ishigami | 345/145 X |
| 5,107,443 | 4/1992 | Smith et al. | 345/340 |
| 5,119,476 | 6/1992 | Texier | 340/710 |
| 5,146,556 | 9/1992 | Hullot et al. | 345/348 |
| 5,191,641 | 3/1993 | Yamamoto et al. | 345/145 X |
| 5,301,348 | 4/1994 | Jaaskelainen | 345/348 |
| 5,374,942 | 12/1994 | Gilligan et al. | 345/341 |
| 5,428,367 | 6/1995 | Mikan | 340/340 |
| 5,432,531 | 7/1995 | Calder et al. | 345/145 X |
| 5,457,480 | 10/1995 | White | 345/163 |
| 5,473,343 | 12/1995 | Kimmich et al. | 345/145 |
| 5,495,566 | 2/1996 | Kwatinetz | 345/341 |
| 5,508,717 | 4/1996 | Miller | 345/145 X |
| 5,515,491 | 5/1996 | Bates et al. | 345/341 |
| 5,533,182 | 7/1996 | Bates et al. | 345/340 |
| 5,559,943 | 9/1996 | Cyr et al. | 345/145 X |
| 5,568,603 | 10/1996 | Chen et al. | 345/340 |
| 5,586,243 | 12/1996 | Barber et al. | 345/326 |
| 5,732,228 | 3/1998 | Jaaskelainen, Jr. | 345/145 X |
| 5,737,555 | 4/1998 | Gregg et al. | 345/145 X |
| 5,771,036 | 6/1998 | Martin et al. | 345/145 |
| 5,784,056 | 7/1998 | Nielsen | 345/332 |

OTHER PUBLICATIONS

"Stealth or Hidden Widget," IBM Technical Disclosure Bulletin, vol. 39, No. 6, Jun. 1996.

*Primary Examiner*—John E. Breene
*Attorney, Agent, or Firm*—Jeffrey S. LaBaw; David H. Judson

[57] ABSTRACT

A widget, a predefined region of a graphical display, and a graphical pointer or cursor are displayed on the display device. A user may define a gravitational widget where traversal rates are not constant on the display. In addition, relationships may be defined which correlates manipulation of the graphical pointing device, the movement of the graphical pointer and a widget. Certain users may be denied access to one or more widgets. When the graphical pointer contacts the border of the widget, the graphical pointer may be denied access to the widget by controlling the graphical pointer. Control of the graphical pointer is accomplished through a defined relationship or action rule. Various action rules forbidding access to a widget include moving or displacing the graphical pointer to a home position, skipped over the widget with the graphical pointer, freezing or sticking the graphical pointer to the widget, displacing the graphical pointer to a random location on the screen, rebounding the graphical pointer, racing the graphical pointer around the widget's border, and repeatedly backing-up and moving forward the graphical pointer. Two or more action rules may be combined so that multiple movements may be achieved.

16 Claims, 8 Drawing Sheets

CURSOR MOVING TO HOME POSITION
UPON CONTACT WITH WIDGET

FIG. 9

CURSOR FLYOVER UPON
CONTACT WITH WIDGET

FIG. 10

CURSOR REBOUND UPON
CONTACT WITH WIDGET

FIG. 11

CURSOR RACE UPON
CONTACT WITH WIDGET

FIG. 12

CURSOR MOVING TO RANDOM POSITION
UPON CONTACT WITH WIDGET

METHOD AND SYSTEM FOR DENYING GRAPHICAL POINTER ACCESS TO A WIDGET OF A DATA PROCESSING SYSTEM GRAPHICAL USER INTERFACE

BACKGROUND OF THE INVENTION

1. Technical Field

The present invention relates in general to a method and system for data processing and in particular to an improved method and system of user interface to a data processing system. Still more particularly, the present invention relates to an improved method and system for denying graphical pointer access to a visible or hidden widget output on a display screen.

2. Description of the Related Art

Within data processing systems, user interface is accomplished in a variety of ways. An increasingly common type of user interface is a graphical user interface (GUI), which provides a user with a graphical and intuitive display of information. Typically, the user interacts with a GUI display with a graphical pointer, which a user controls utilizing a graphical pointing device, such as a mouse, track ball, or joystick. Depending upon the actions allowed by the application of operating system software, the user can select a widget (i.e., a user-discernible feature of the graphic display) by positioning the graphical pointer over the widget and depressing a button associated with the graphical pointing device. Furthermore, depending upon the type of widget, the user can relocate the widget within the graphical display utilizing the well-known drag-and-drop technique. Conventionally, the motion of the graphical pointer within the GUI display has a fixed relationship to the manipulation of the graphical pointing device over all portions of the graphical display. For example, if the user moves the graphical pointing device two units to the right, the graphical pointer responds by moving two scaled units to the right within the graphical display.

While user-control of the display pointer is advantageous, there are situations where it is desirable to have the graphical display pointer behavior beyond the control of the user and, instead, under control Of the system or some administrator of the system. For example, in a network environment, supervisors and employees may have access to the same set of windows and fields on display screens. Under certain circumstances, it is desired to preclude employees from using some of the fields, e.g., for data entry, whereas supervisors may have unlimited access rights. In the past, when a user with a low level of security access keys in data or uses the "Enter" key within certain areas of the screen, a program has been provided to reject the data and then display an error message. This approach is disadvantageous because considerable user and computer time is wasted in entering data that can only be rejected. Another disadvantage is that the method of rejection, including the contents of the error message, may encourage and assist computer hackers in circumventing security procedures. Still another problem with this approach is that there is no practical means of providing timely counseling to users who repeatedly attempt to enter the data.

Consequently, it would be desirable to provide an improved method and system for controlling the movement of a graphical pointer within a GUI. In particular, it would be highly desirable to provide a method and system for forbidding the graphical display pointer from actually entering or coming to rest within certain areas of the display screen, or to trap the pointer if it attempts to come to rest in certain areas of the screen.

SUMMARY OF THE INVENTION

It is therefore a principal object of the present invention to prevent a user's graphical display pointer from entering an area of a display screen, a so-called "forbidden" widget.

It is another object of the present invention to provide an improved method and system of user Interface within a data processing system wherein a graphical display pointer is restricted from accessing specific areas of a display screen.

It is a more particular object of the invention to control a graphical display pointer to automatically skip over a visible or hidden widget on a display screen.

Another object of the invention is to freeze or "trap" a graphical display pointer when the pointer contacts a visible or hidden widget on a display screen.

Still another more specific object of the invention is to repel a graphical display pointer backwards when the pointer contacts a visible or hidden widget on a display screen.

Yet another specific object of the invention is to rapidly drive or "fling" a graphical display pointer to a random screen location when the pointer contacts a visible or hidden widget on the display screen.

Another object is to rapidly drive a graphical display pointer to a "home" screen position when the pointer contacts such a widget.

A still further object is to rapidly drive or "race" the graphical display pointer around the border of the widget when the pointer contacts the widget.

These and other objects are provided by a method and system for controlling positioning of a graphical pointer displayed on a display device of a data processing system having a graphical pointing device. According to the present invention, a widget and a graphical pointer are displayed on the display device. The widget is a predefined region of a graphical display and has a border, which is typically shaped as a quadrilateral, i.e. a square of rectangle. A first relationship is defined that correlates manipulation of the graphical pointing device and movement of the graphical pointer when the graphical pointer is external to the widget A second relationship is also defined that correlates manipulation of the graphical pointing device and movement of the graphical pointer, if any, when the graphical pointer contacts a predetermined portion of the widget. In response to a manipulation of the graphical pointing device, the graphical pointer moves in accordance with the first relationship when the graphical pointer is displayed at positions outside the widget and is controlled in accordance with the second relationship when the graphical pointer contacts the predetermined portion of the widget, e.g., the widget border. The second relationship "denies" the graphical display pointer access to the widget in one or more different ways, e.g., by causing the pointer to skip over the widget, by trapping the pointer, by repelling the pointer backwards along its line of approach, or by flinging the pointer to a random or home position within the first region.

According to another aspect of the present invention, it is desirable to use such forbidden widgets with respect to different classes of users of a computer system. In this example, a first class of users is permitted access to the widgets while a second class is restricted.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
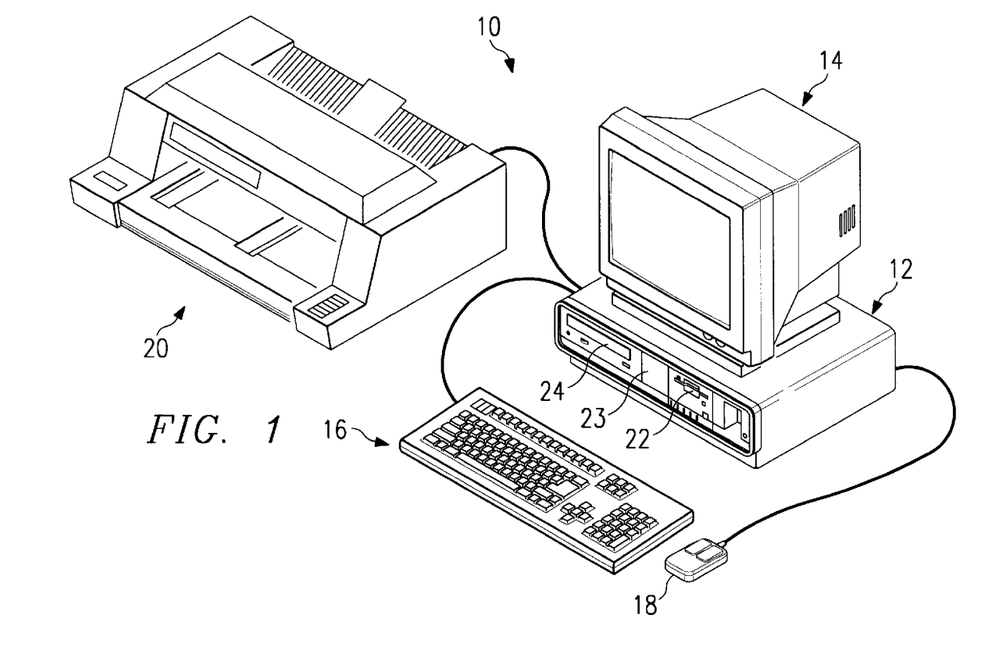
FIG. 1 is a pictorial representation of a data processing system which may be utilized to implement the method and system of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not Illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled In the art will recognize that other graphical pointing devices, including a graphics tablet, stylus, light pen, joystick, puck, trackball, trackpad, and the IBM TrackPoint can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
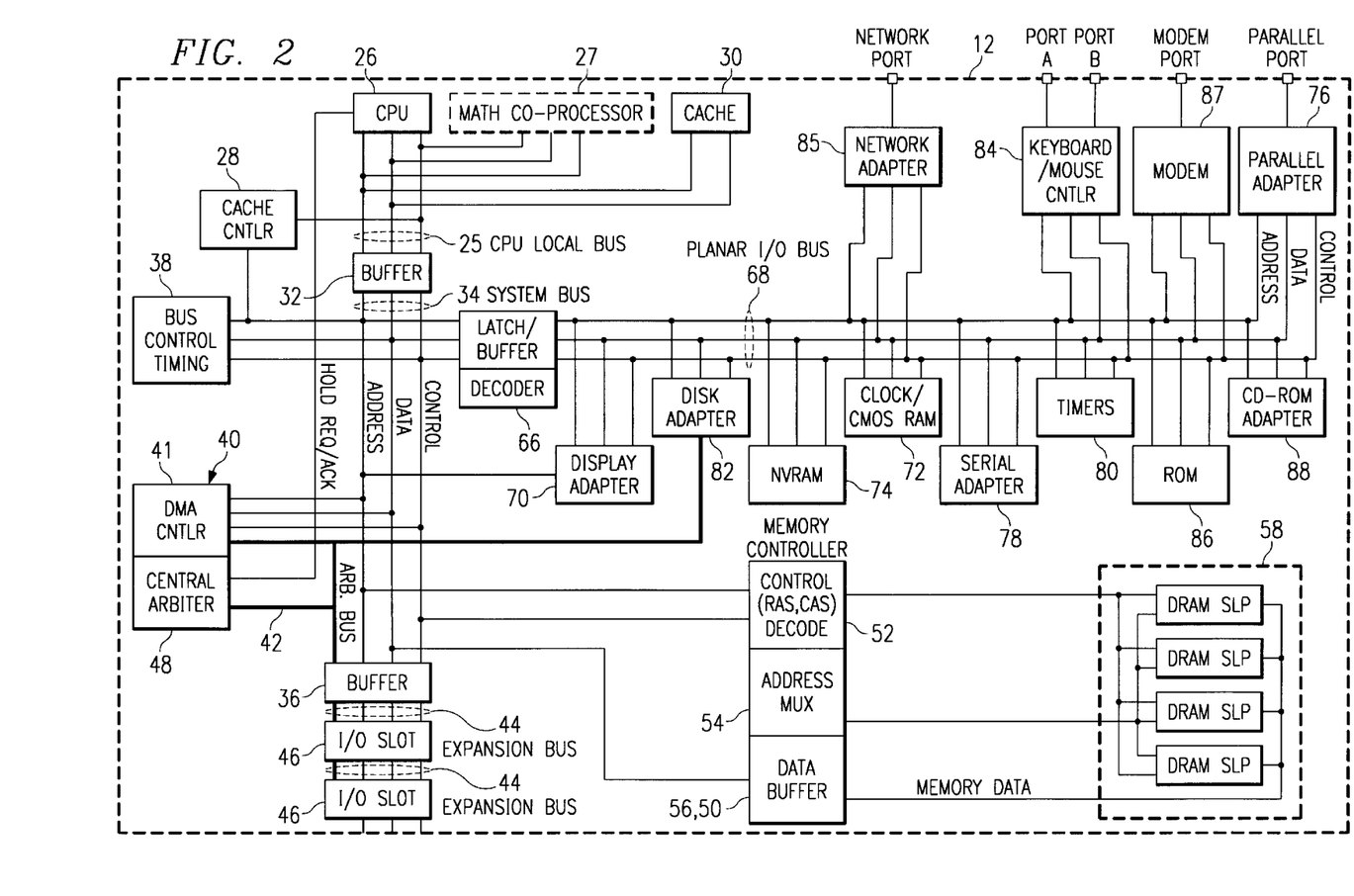
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC line of microprocessors available from IBM Microelectronics. Alternatively, CPU 26 can be implemented as one of the 80×86 or higher microprocessors, which are available from a number of vendors. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized bar CPU 26 into physical addresses within RAM 58. As will be appreciated by those skilled In the art, RAM 58 comprises a number of individual volatile memory modules which store segments of operating system and application software while power is supplied to data processing system 10. The software segments are partitioned into one or more virtual memory pages which, each contain a uniform number of virtual memory addresses. When the executor, of software requires more pages of virtual memory that can be stored within RAM 58, pages that are not currently needed are swapped with the required pages, which are stored within nonvolatile storage devices 22–24.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user node can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 16 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations expansion bus 44 to be created by the addition of bus master adapters containing a processor and its support chips.

System bus 34 is coupled to planar I/O bus 68 through buffer 66. Attached to planar I/0 bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 74 stores system configuration data that describes the present configuration of data processing system 10. For example, nonvolatile RAM 74 contains information that describes the capacity of hard disk drive 24 or a diskette placed within diskette drive 22, the type of display device 14, the amount of free RAM 58, and the present system configuration. These data remain stored in nonvolatile RAM 74 when power is removed from data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system to ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18. As will be described in greater detail below, keyboard/mouse controller 84 receives a serial signal from mouse 18 that indicates each incremental displacement of mouse 18.

Finally, system unit 12 includes network adapter 85, modem 87, and parallel adapter 76, which facilitate communication between data processing system 10 and peripheral devices or other data processing systems. Network adapter 85 Is utilized to connect data processing system 10 to an unillustrated local area network (LAN). A LAN provides a user of data processing system 10 with a means of electronically communicating information, including software, with a remote computer or a network logical storage device. Additionally, LAN supports distributed processing, which enables data processing system 10 to share a task with other data processing systems linked to the LAN. Modem 87 supports communication between data processing system 10 and another data processing system over a standard telephone line. For example, modem 87 may be utilized to connect data processing system 10 to an on-line information service, such as America OnLine, Prodigy or CompuServe. Such on-line service providers frequently offer software that can be downloaded into data processing system 10 via modem 87. Furthermore, through modem 87, data processing system 10 can access other sources of software, such as a server, an electronic bulletin board, and the Internet or World Wide Web. Parallel port 76 transmits printer control signals and output data to printer 20 through a parallel port.

As is typical of many data processing systems, following power-on, the various hardware components of data processing system 10 will each execute its own internal reset procedures to regain a stable, known state. At the completion of these reset procedures, CPU 26 will execute POST code within ROM 86 to initialize system hardware, setup the BIOS data area, and construct and interrupt vector table, as well as other tasks. Following POST, a "boot strap" or primary operating system loader is run to load segments of an operating system (OS) 100 (see FIG. 3) into RAM 58 and launch execution of OS 100, which in a preferred embodiment of the present invention comprises OS/2 Warp, available from IBM Corporation.

Figure 3:
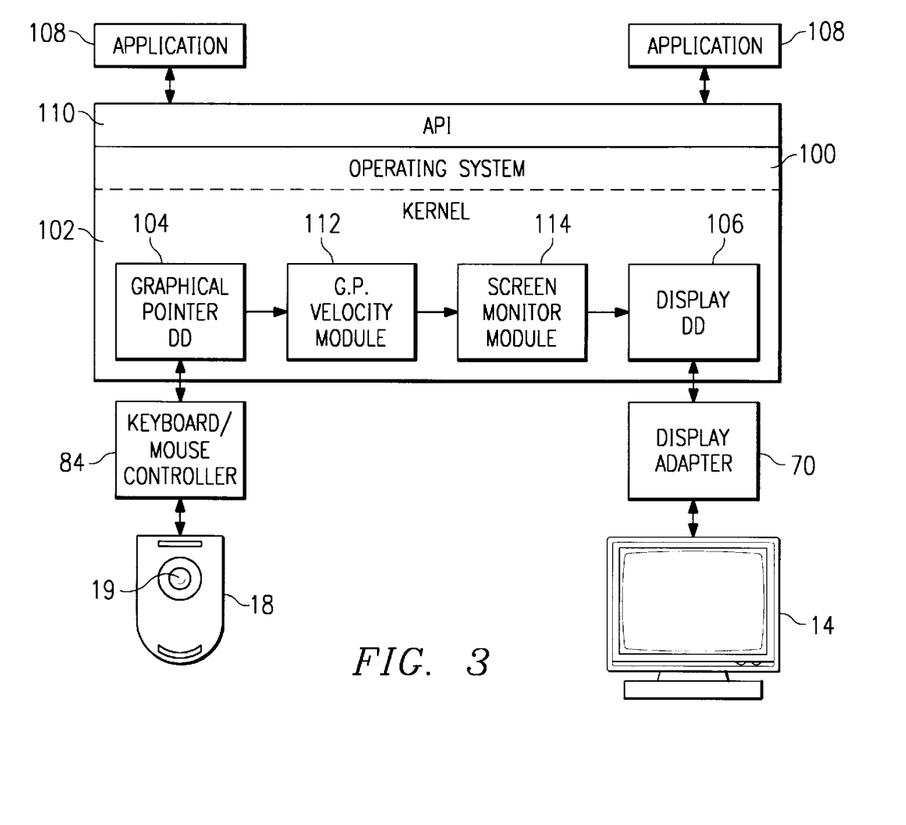
FIG. 3 illustrates a conceptual diagram of the interaction between a graphical pointing device, the software configuration utilized by the present invention, and a display device.

With reference now to FIG. 3, there is illustrated a pictorial representation of the software configuration of data processing system 10 following power-on. As depicted, the software configuration of data processing system 10 comprises OS 100, which includes kernel 102, and one or more applications 108, which communicate with OS 100 through Application Programming Interface (API) 110. Kernel 102 comprises the lowest level of OS 100 that controls the operation of the hardware components of data processing system 10 through device drivers, such as graphical pointer device driver 104 and display device driver 106.

As illustrated, graphical pointer device driver 104 and display device driver 106 communicate with keyboard/mouse controller 84 and display adapter 70, respectively, to support the interconnection of mouse 18 (illustrated in a bottom view) and display device 14 with data processing system 10. In response to movement of trackball 19 of mouse 18, mouse 18 transmits an analog graphical pointer signal to keyboard/mouse controller 34 that describes the direction and rotation of trackball 19. Keyboard/mouse controller 84 digitizes the analog graphical pointer signal and transmits the digitized graphical pointer signal to graphical pointer device 10 driver 104, which thereafter interprets the digitized graphical pointer signal and routes the interpreted graphical pointer signal to graphical pointer velocity module 112 within kernel 102. Graphical pointer velocity module 112 modifies the interpreted graphical pointer signal to retard or accelerate the rate of movement of the graphical pointer manipulated utilizing mouse 18. Graphical pointer velocity module then passes the modified and interpreted graphical pointer signal to screen monitor module 114, which performs GUI actions based on the position of the graphical pointer within display device 14. For example, screen monitor module 114 causes a window to surface within a GUI in response to a user selection of a location within the window. In addition, according to present invention, screen monitor module 114 selectively controls the traversal rate of the graphical pointer when the graphical pointer is positioned within a widget displayed within display device 14. Finally, the graphical pointer signal is passed to display device driver 106, which routes the data within the graphical pointer signal and other display data to display adapter 70, which translates the display data into the R, G, and B signals utilized to drive display device 14. Thus, the movement of trackball 19 of mouse 18 results In a corresponding movement of the graphical pointer displayed within display device 14.

Figure 4:
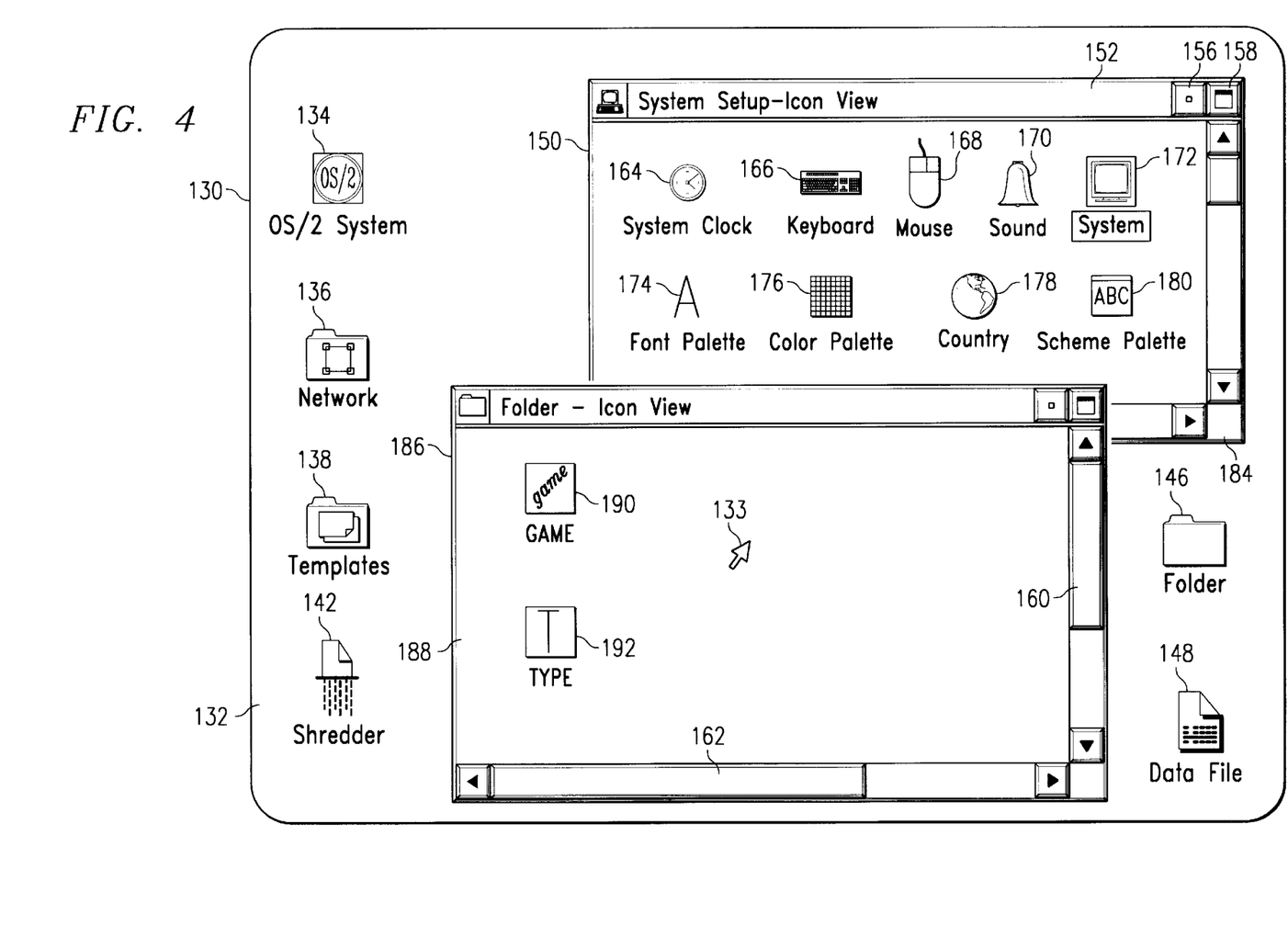
FIG. 4 depicts a pictorial representation of a desktop displayed within the display device of the data processing system Illustrated in FIG. 1.

Referring now to FIG. 4, there is depicted a preferred embodiment of the graphical user interface (GUI) employed by OS 100. Screen 130 displayed to a user within display device 14 includes a background desktop 132 upon which a plurality of user-selectable icons 134–148 are displayed. Each icon 134–148 represents an program, function, or file storage area, which a user can conveniently select utilizing graphical pointer 133 by double-clicking the left button of mouse 18. When a user selects one of icons 134–148, the function corresponding to the selected icon is activated and the selected icon is highlighted. Many of icons 134–148 have an associated window or series of windows that are displayed when the icon is selected. For example, when OS/2 System icon 134 is selected, window 150 is displayed to the user to provide further possible selections (i.e. icons 164–180). In the depicted example, folder icon 146 has also been selected. Accordingly, folder window 186, which contains GAME icon 190 and TYPE icon 192, is also displayed to the user on desktop 132. Windows 150 and 186 include a title bar 152, which identifies the contents of each window, and shrink and grow buttons 142 and 144, which are utilized to minimize (close) or maximize (set to full screen size) each of windows 150 and 186. Each of windows 160 and 186 also provides vertical and horizontal scroll bars 160 and 162, respectively, to enable a user to scroll through the contents of the corresponding window and a display area 188, upon which a plurality of icons can be displayed. Finally, windows 150 and 186 Include resizing box 184, which enables a user to resize the associated one of windows 150 or 186 utilizing the familiar drag-and-drop technique. According to the present invention, each of the hereinbefore described graphical features of the GUI depicted in FIG. 4, including desktop icons 134–148, windows 150 and 186, display areas 188, scroll bars 160 and 162, etc., can be defined as a "forbidden" widget. In accordance with the present invention, the graphical pointer 133 is denied access to a forbidden widget.

Figure 5A:
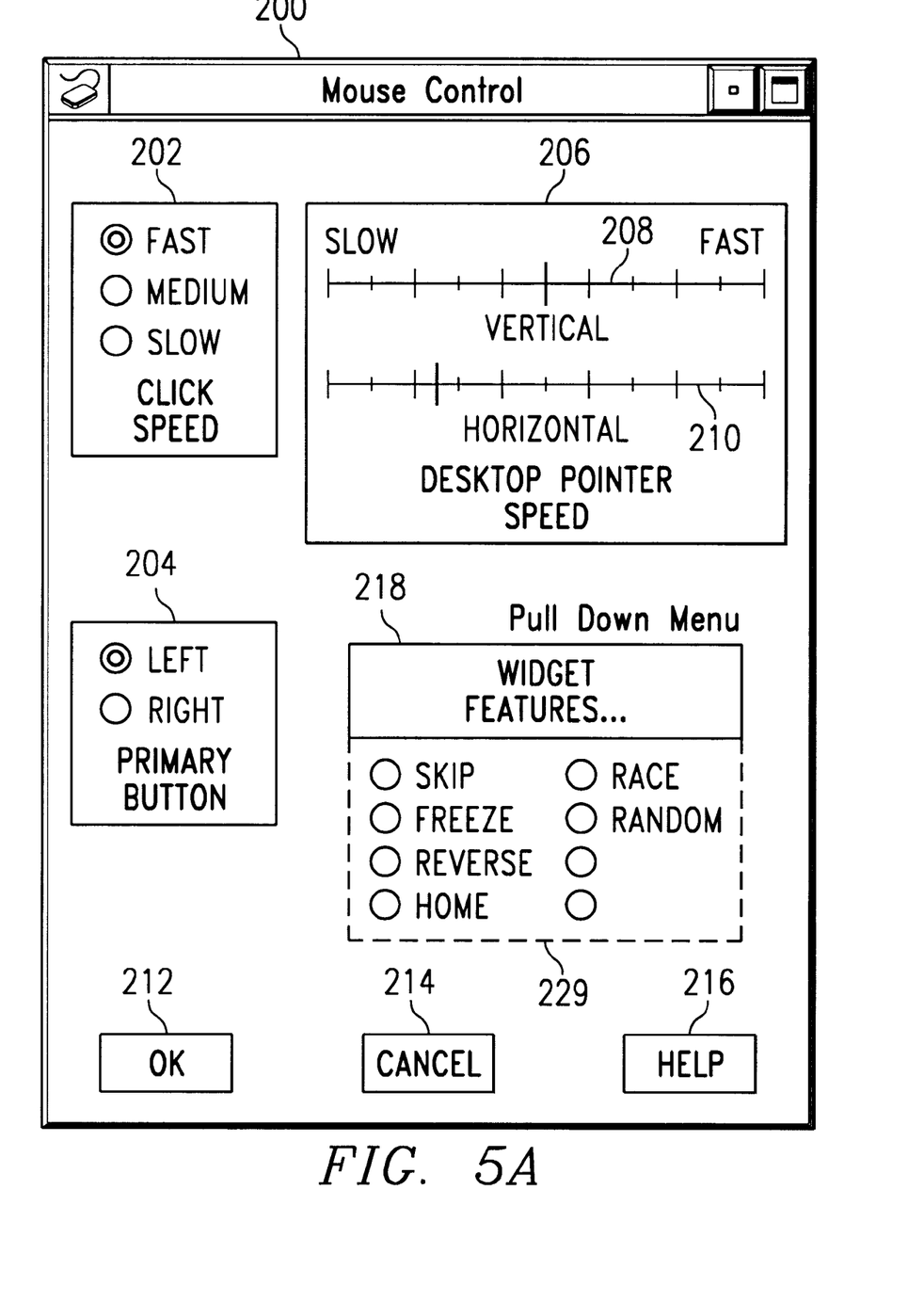
FIGS. 5A and 5B illustrate dialog boxes utilized by a user to control the operational characteristics of a graphical pointer displayed within the display device of the data processing system depicted in FIG. 1.
Figure 5B:
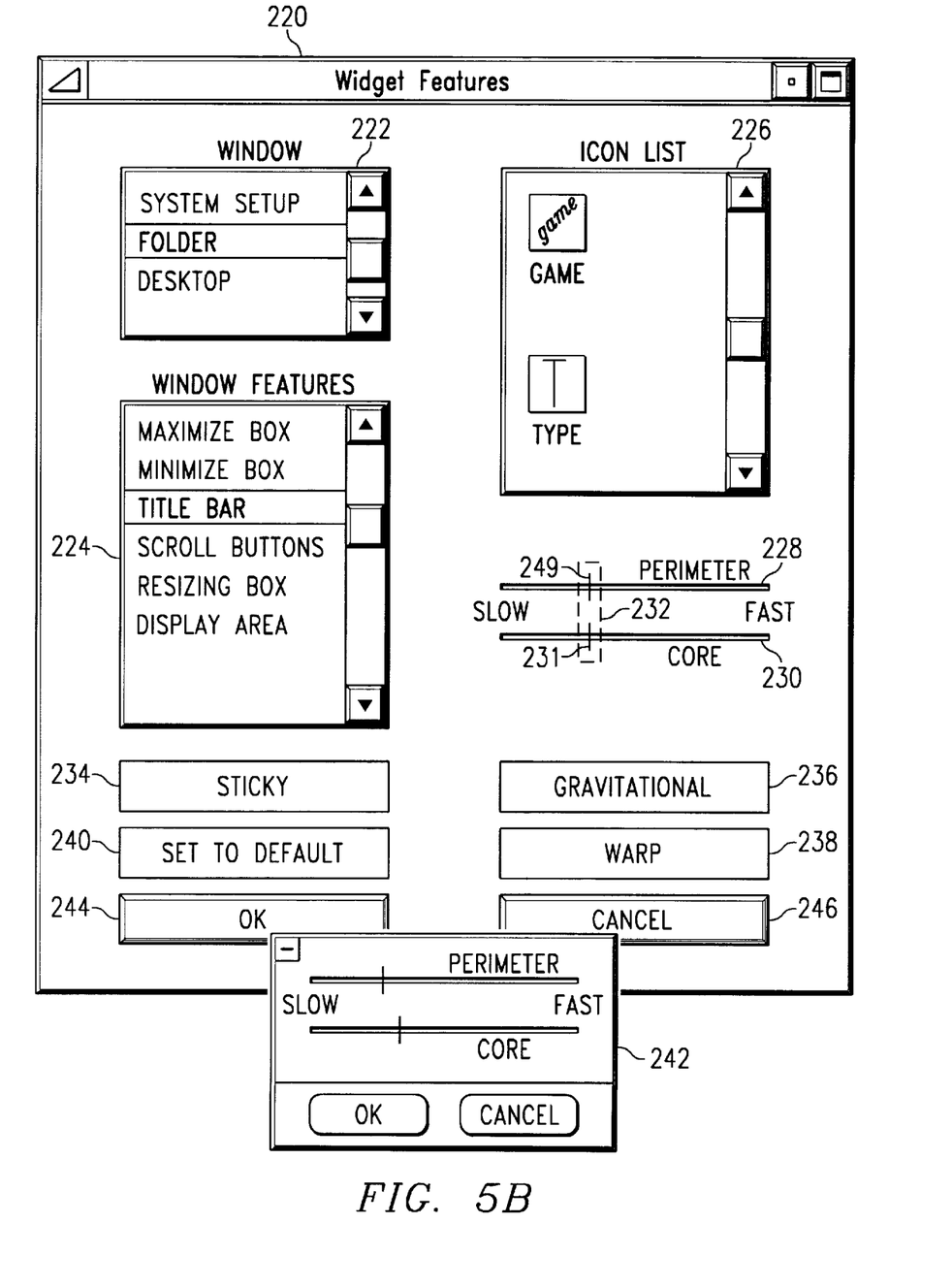

With reference now to FIGS. 5A–5B, there are illustrated two windows utilized to create and customize widgets within the GUI display depicted in FIG. 4 according to a preferred embodiment of the present invention. One such widget is a forbidden widget, which the graphical pointer may not access. Such access restriction may be set on a per user basis, as will be described below.

The windows shown in FIGS. 5A–5B are used to set the traversal rate and other characteristics of graphical pointer 133. To set the traversal rate, the user selects mouse icon 168 depicted in FIG. 4. In response to user selection of mouse icon 168, mouse control window 200 illustrated in FIG. 5A is displayed on desktop 132. Utilizing graphical pointer 133, the user can select between the mutually exclusive options within primary button control 204 and click speed control 202 to determine the primary selection button of mouse 18 and the rapidity of button depressions required to make a selection, respectively. In addition, by manipulating slider bars 208 and 210, the user can set the vertical end horizontal sensitivity of graphical pointer 133 to movement of trackball 19 of mouse 18. As will be appreciated by those skilled in the art, desktop pointer speed control 206 enables a user to set a "global" traversal rate that is uniform throughout screen 130 of FIG. 4. Along the bottom edge of mouse control window 200 are displayed OK button 212, CANCEL button 214, and HELP button 216, which enable a user to confirm, cancel, or receive further information about selections within mouse control window 200.

Furthermore, according to the present invention, mouse control window 200 includes forbidden widget features button 218. When this button is clicked, a pull down menu 229 is opened. Menu 229 lists various forbidden widget features including "skip over," "trap," "reversal," "race," "home," "random" or the like. Preferably, pull down menu 229 Is not accessible by just any user of the machine; rather, only certain users such as the system operator or owner are permitted to establish forbidden widgets. The particular type of forbidden widget is then set by clicking one or more of the features in menu 229.

Referring now to FIG. 5B, there is depicted a preferred embodiment of a window displayed to enable an authorized user to select which elements of the graphical display will be "forbidden" widgets. In response to user selection of forbidden widget features button 218 of mouse control window 200, widget features window 220 is displayed on desktop 132. Window features window 220 may also be used to set a customized traversal rate for graphical pointer 133 within a particular (non-forbidden) widget, and thus the window 220 includes a number of control buttons and switches. TO establish a forbidden widget, the user first selects a region of screen 130 from window list 222, which contains each open window displayed on desktop 132 In addition to desktop 132 itself. For example, in FIG. 5B, the user has selected folder window 186. Next, the user selects a feature within either window features list 224 or icon list 226. As illustrated, window features list 224 contains each feature of windows 150 and 186 while icon list 226 comprises a list of icons within the region selected within window list 274. In the depicted example, the user has selected the title bar within window features list 224 as the forbidden widget. Following the selection of one of the items within either window features list 224 or icon list 226, the user sets the forbidden widget type by clicking in the pull down menu 229 of FIG. 5A.

According to the present invention, it may be desirable to "trap" the graphical pointer within or at the border of a forbidden widget. TO establish this setting manually, the window 220 includes sliders 228 and 230 or buttons 234–238. By way of brief background, to set the traversal rate of graphical pointer 133 utilizing sliders 228 and 230, the user positions ganged switches 249 and 231 along sliders 228 and 230 to control the traversal rate of graphical pointer 133 within the perimeter and core, respectively, of a selected widget. If the user desires to independently set the perimeter traversal rate and the core traversal rate of graphical pointer 133, the user simply clicks on latch 232, thereby releasing switches 229 and 231 from latch 232 to slide independently. Various combinations of positions of switches 249 and 231 along sliders 228 and 230 give the selected widget different characteristics.

Thus, for example, if switches 249 and 231 are positioned to give graphical pointer 133 a relatively slow traversal rate, the selected widget will be perceived by the user to be "sticky." Alternatively, the user may simply select sticky button 234, which sets the traversal rate of graphical pointer 133 within the selected widget to a default "sticky" setting. According to the invention, the slowest setting of switches 249 and 231 causes graphical pointer 133 to have a zero traversal rate, which has the effect of "trapping" or "freezing" the pointer on the forbidden widget. In this situation, once graphical pointer 133 is "parked" on a forbidden widget, graphical pointer 133 can be removed from the widget only by entering a secondary input, for example, a depression of the secondary mouse button, while manipulating mouse 18.

According to another feature of the invention, a graphical pointer is denied access to the "forbidden" widget by causing the pointer to skip over the widget at a fast traversal rate. Thus, as another option, switches 249 and 231 can both be positioned along sliders 228 and 230 to give graphical pointer 133 a relatively fast traversal rate. Alternatively, the user can simply select warp button 238, which sets the traversal rate of graphical pointer 133 to a system-determined fast traversal rate.

The widget functions window 220 provides other optional control characteristics that may be useful in configuring forbidden widgets. For example, a user can define a particular widget as a "gravitational" widget utilizing either sliders 228 and 230 or gravitational button 236. A "gravitational" widget is one that has a slow core traversal rate and a fast perimeter traversal rate. Configuring a widget as a "gravitational" widget enables a user to quickly lock on to a feature within a GUI display, such as a window edge, which may otherwise be difficult to select, since graphical pointer 133 would tend to overtrack into the core of the widget once graphical pointer 133 was positioned within the widget's perimeter. Another option available within widget features window 220 is to set the traversal rate of graphical pointer 133 while within the widget to a default setting determined by the background of the widget.

Widget features window 220 contains OK button 244 and CANCEL button 246, which enable the user to confirm or reject choices made within window features button 220. Those skilled in the art will recognize that the control features within dialog boxes 200 and 220 depicted in FIGS. 5A and 5B can be implemented in a variety of ways. However, in a preferred embodiment of the present invention, dialog boxes could be implemented as extensions to the Open Software Foundation (OSF) Motif programming language. Details of OSF Motif are available from Prentice-Hall.

In accordance with the present invention, it is desired to restrict or "forbid" access to one or more widgets output on the display screen. A widget is said to be "output" on the screen because it may or may not be visible to the user. An invisible widget is sometimes referred to as a "stealth" widget. Generally, a widget is quadrilateral in shape and thus has a predefined border, as was illustrated in FIG. 4 with respect to icons 134–148, title bar 152 or scroll bar 160.

Figure 6:
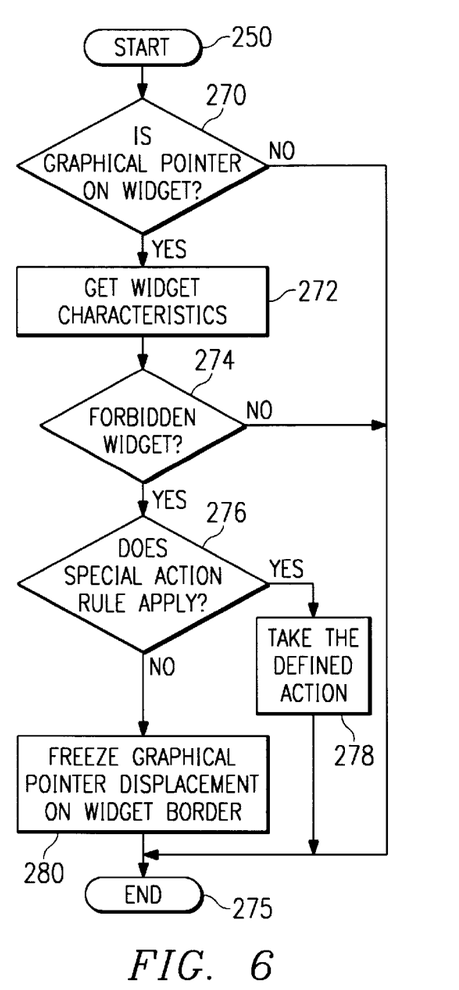
FIG. 6 is a flowchart depicting the method utilized by the present invention to deny a graphical pointer access to a forbidden widget.

Referring now to FIG. 6, there is depicted a high-level flowchart of a preferred embodiment of the method utilized by the present Invention to deny a graphical pointer access to a "forbidden" widget in response to manipulation of mouse 18. The method illustrated within FIG. 6 is preferably implemented within screen monitor module 114 within kernel 102 of operating system 100; however, those skilled in the art will recognize that the method illustrated in FIG. 6 may alternatively be implemented within a stand-alone routine. As illustrated, the process begins at block 250, and thereafter proceeds to 270 wherein a test is performed to determine whether the graphical pointer is on a predetermined portion of the widget, e.g., the widget border. The test at step 270 is carried out by the screen monitor module 114 determining from the graphical pointer signal whether graphical pointer 133 is positioned on the widget border. The logical determination utilizes the well-known method of comparing the X-Y coordinates of the graphical pointer 133 with the boundaries of the defined widget. If the outcome of the test at step 270 is negative, the routine branches to block 275 and ends. If the outcome of the test at step 270 is positive, however, the routine continues at step 272, which depicts screen monitor module 114 obtaining the characteristics of the widget on which graphical pointer 133 is positioned.

Then, the routine tests at step 274 to determine whether the widget has been previously defined as being "forbidden." If not, again the routine branches to block 275 and ends. If the graphical pointer is on a forbidden widget, the output of the test at step 274 is positive, and the routine continues at step 276. At step 276, a test is performed to determine whether one of a set of action rules has been defined for the forbidden widget. These action rules are designed to move or "displace" the graphical pointer to some location outside or "without" the forbidden widget. If the outcome of the test at step 276 is positive, then the routine continues at step 278 by taking the defined action. Thereafter, the routine terminates. On the other hand, if the result of the test at step 276 is negative, then (by default) the routine continues at step 280 to "freeze" the graphical pointer on the widget border (since the widget is "forbidden"). Preferably, this is accomplished, as noted above, by establishing the forbidden widget as "sticky" and setting the traversal rate to zero. The graphical pointer may then be "unstuck" by double clicking the mouse and moving the graphical pointer to a position external to the forbidden widget. Double clicking to unstick the pointer, however, may be overridden by settings made by the system operator or owner.

Figure 7:
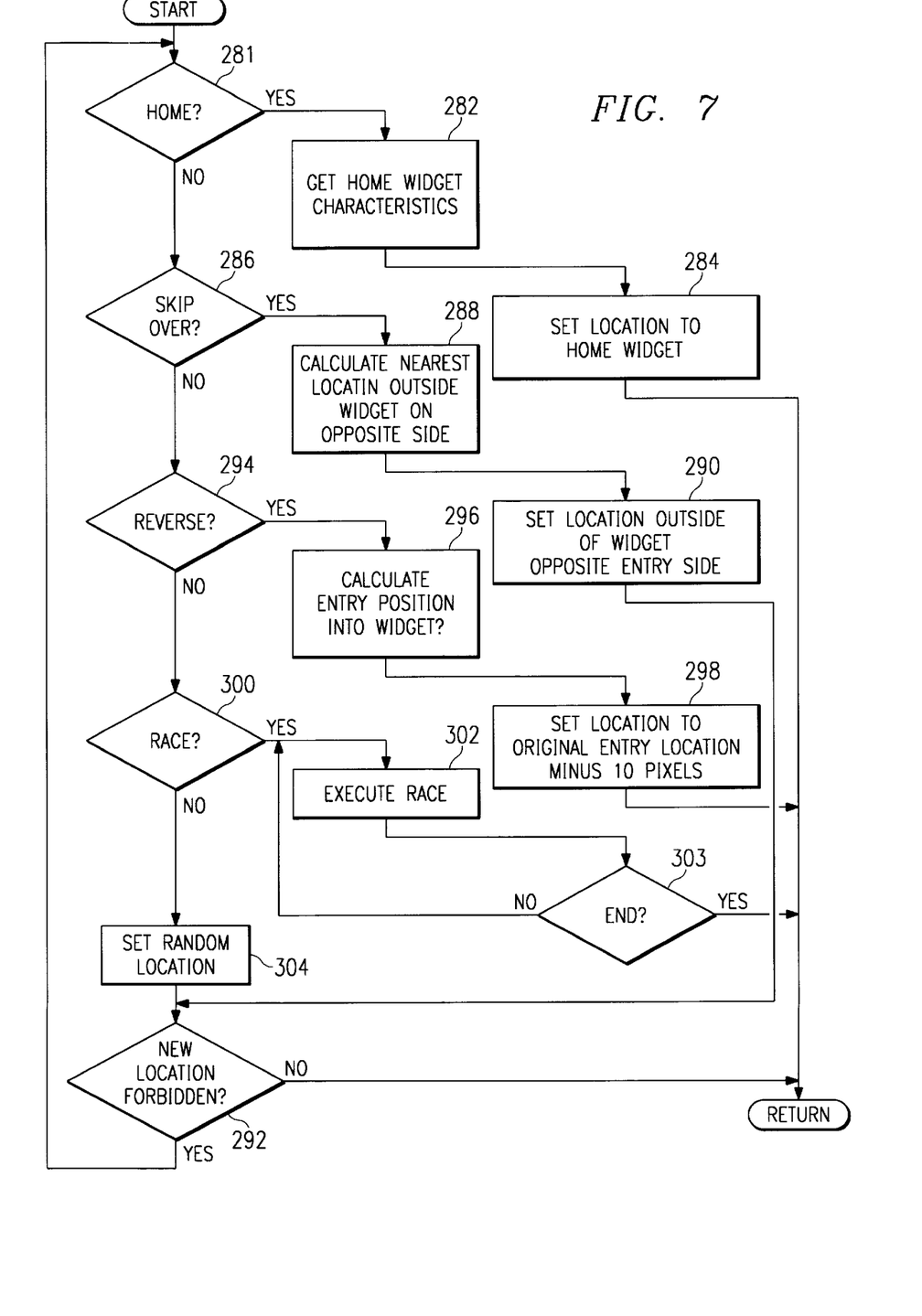
FIG. 7 is a flowchart depicting the method utilized by the present invention for displacing the graphical pointer away from the forbidden widget.

Step 278 is illustrated in the flowchart of FIG. 7. As noted above, this step invokes some predetermined action (as opposed to merely trapping the pointer) that, in effect, denies the graphical pointer access to the widget by displacing the pointer outside the widget. As described above with respect to FIG. 5A, when each forbidden widget is established, one or more action "rules" associated with the widget may be created to control how the pointer is restricted from accessing the widget. Such restriction may be enforced in one or more ways, such as controlling the pointer to "skip over" the widget, to be driven backwards away from the widget, to be moved to a "home" widget, to be to be moved to a random screen position, to "race" around the widget border, etc. The routine begins when the pointer has "hit" the border of a widget, which as noted above may be visible or hidden.

At step 281, a test is performed to determine whether a "home" rule has been established for the particular widget.

Figure 8:
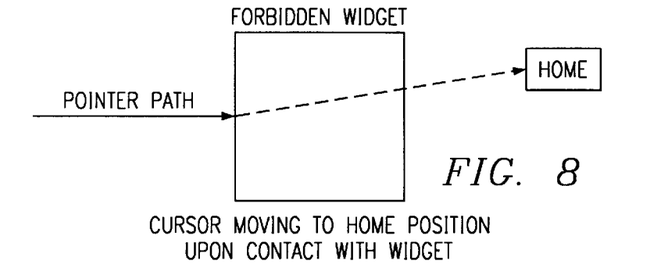
FIG. 8 illustrates an operation whereby a graphical pointer is driven to a home widget upon landing on a forbidden widget.

If so, then the routine will move the graphical pointer rapidly to a "home" widget, which by definition cannot also be a forbidden widget, by getting the home widget characteristics at step 282. At step 284, the routine sets the pointer location to the home widget, which has the effect of moving the pointer there. This is illustrated in FIG. 8. If the outcome of the test at step 281 is negative, then the routine continues to test for the other action rules.

Figure 9:
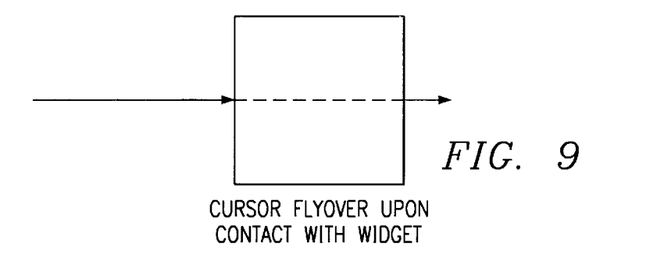
FIG. 9 illustrates a "skip over" operation with respect to a forbidden widget.

At step 286, for example, the routine tests to determine whether a "skip over" rule has been set for the forbidden widget. If the outcome of the test is positive, the routine continues at step 288 to calculate a nearest location outside the widget on an opposite side of the X-Y border position initially contacted by the pointer. At step 290, the routine sets the location of the pointer outside the widget "opposite" the position at which the pointer contacts the forbidden widget. A test at step 292 Is then performed to determine whether the new location is another forbidden widget. If not, then the pointer is automatically driven to the new location, preferably at a "warp" speed setting so that the pointer appears to "skip" or jump over the forbidden widget. This is illustrated in FIG. 9. If the outcome of the test at step 292 is positive, the skip over position action cannot be performed and the routine returns as shown.

Figure 10:
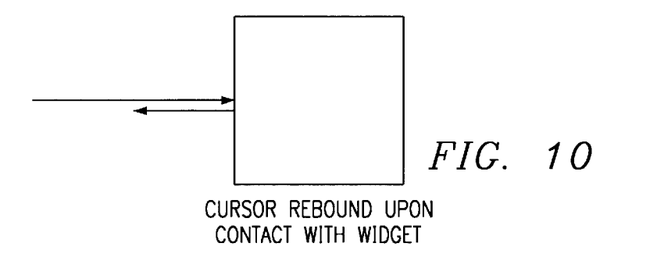
FIG. 10 illustrates a "reverse" operation with respect to a forbidden widget.

If the outcome of the "skip" test 286 Is negative, the routine continues at step 294 to test whether a "reverse" action rule has been set. If the outcome of the test at step 294 is positive, the routine continues at step 296 to calculate an entry position of the pointer. This is the position of the pointer on the forbidden widget border. Then, the routine continues at step 298 and sets the location of the graphical pointer to the original entry location minus some predetermined pixel value, e.g., ten (10) pixels, to thereby drive the pointer backwards. Preferably, the "reverse" action rule causes the graphical pointer to move backwards along the same tracking line at which it approached the forbidden widget, although this is not required. The reverse tracking action is illustrated in FIG. 10.

Figure 11:
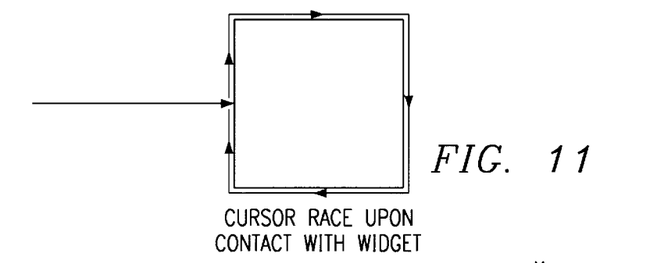
FIG. 11 illustrates a "race" operation with respect to a forbidden widget.

If the outcome of the test at step 294 is negative, the routine then performs a test at step 300 to determine if a "racehorse" action rule has been set. If the outcome of the test at step 300 is positive, the routine continues at step 302 to drive the pointer around the forbidden widget border at a settable rate. This action is illustrated in FIG. 11. A test 303 determines whether the race operation should be terminated, by double clicking the mouse.

Figure 12:
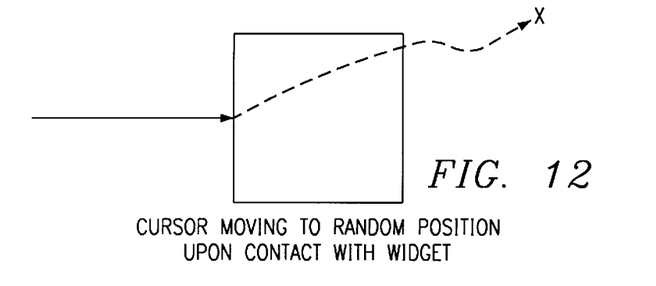
FIG. 12 illustrates an operation whereby a graphical pointer Is driven to a random position on the screen upon encountering a forbidden widget.

If the outcome of the test at step 300 is negative, by default the routine continues at step 304 to set a "random" location for the pointer. The test at step 292 is then performed again to determine whether the new location is another forbidden widget. If not, as noted above the pointer is automatically driven to the new location. This action is illustrated In FIG. 12.

It should be appreciated that the sequence and nature of the action rules illustrated in FIG. 7 is not meant to be limiting. If desired, other rules may be added or the existing rules enhanced. One such additional rule would cause the cursor to repeatedly back-up and then move forward toward the forbidden widget. Yet another rule would implement an "anti-gravitational" action to allow the pointer to move slightly into the widget and then be repelled backwards. Two or more of the action rules may be combined so that multiple movements of the graphical pointer are carried out, which may be very entertaining for the user. Moreover, the sequence of the action rule tests may be changed in any convenient fashion.

Another desirable feature of the present invention is to use forbidden widgets to prevent certain select users of the computer from accessing files, applications or services. Thus, a supervisor may desire to restrict employees from accessing certain data files. Parents may desire to restrict their children from accessing an application (e.g., a financial program or e-mail) or a computer network such as the Internet. Forbidden widgets are quite useful for this purpose.

Figure 13:
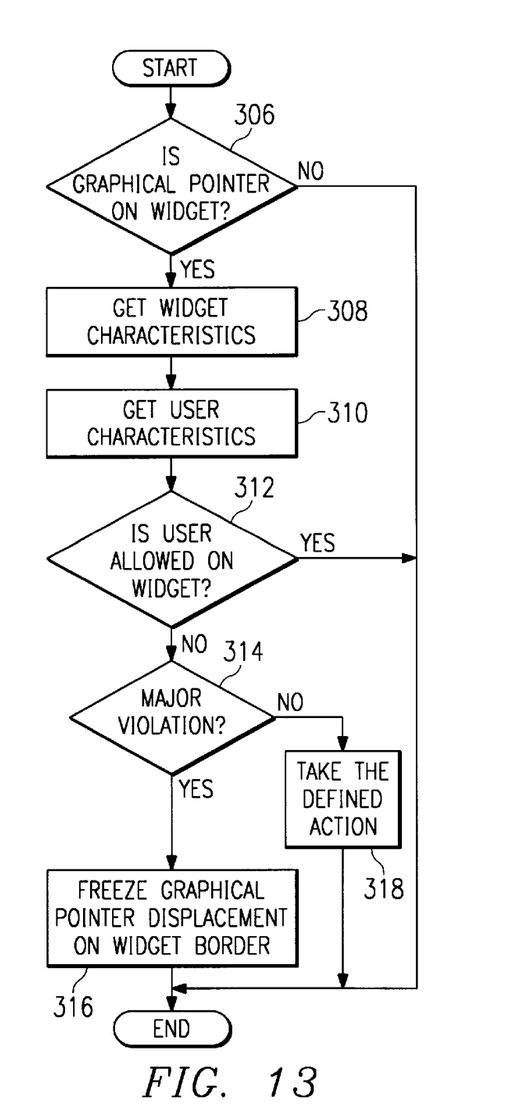
FIG. 13 depicts a flowchart of a preferred method of restricting user access to information stored or accessible via a data processing system using forbidden widgets.

A method of restricting user access to information stored or accessible via a data processing system is illustrated in the flowchart of FIG. 13. This routine assumes that one or more forbidden widgets have been established in the manner previously described. It is also assumed that the multiple users are allowed to use the data processing system but that certain of these users should be restricted from accessing or obtaining certain data, files, applications or services, as the case may be. The routine begins at step 306 with a test to determine whether the graphical pointer is on a widget (which may or may not be visible). If the outcome of the test at step 306 is negative, the routine terminates. If, however, the outcome of the test at step 306 is positive, the routine gets the widget's characteristics at step 308. At step 310, the routine gets the characteristics of the user, which are predefined and, for example, may be associated with the user's password or other identifying information. A test is then made at step 312 to determine whether the user is allowed within the widget. If the outcome of the test at step 312 is positive, the user is allowed in the widget (in other words, the widget is not forbidden, at least to this user), and the routine terminates. If the outcome of the test at step 312 is negative, a test is performed at step 314 to determine whether the user's violation is "major". A major violation means, by way of example only, that the user's violation is so egregious that the system operator or owner desires to "freeze" the graphical pointer so that no further actions use may be made of the computer until the system operator or owner intervenes. Thus, if the outcome of the test at step 314 is positive, the routine branches to step 316 to freeze the pointer. If the outcome of the test at step 314 is negative, however, the violation is not "major." In this instance, the routine continues at step 318 to carry out one or more of the action rules previously defined. Step 318 carries out the flowchart of FIG. 7.

As has been described, the present invention provides an improved method and system for controlling a graphical pointer within a graphical user interface. In particular, the present invention enables a user to create "forbidden" widgets and to easily customize how the graphical pointer is restricted from accessing each such widget, thereby further enhancing the appeal of a graphical user interface as an intuitive and user-friendly method of interacting with a data processing system. One or more users of the system may be restricted from accessing or obtaining data, files, applications or services by associating the user with a forbidden widget. When a restricted user moves the graphical pointer to a widget that is forbidden with respect to that user, the pointer may be stuck to the widget (if the violation is egregious) or merely driven away from the widget. When the pointer is stuck, the system operator or owner may have to take some action to unstick it.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g., read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

The term "graphical pointer" as used here should be broadly construed to cover a cursor, as the teachings of the invention applicable In a keyboard application. In this context, a "graphical pointing device" may include a conventional keyboard, and the forbidden widget may be identified by parsing keystrokes entered into a keyboard buffer. Thus, for example, if a keystroke in the buffer requires some action relative to a forbidden widget, the keystroke may be ignored or otherwise processed in a manner previously described. Further, a widget "border" should be broadly construed to include an outline highlight, which is the part of the widget that becomes outlined when a box widget is highlighted, or the borders of an area that comes into focus (explicitly or implicitly) if no "dark line" border is provided.

While the invention has been particularly shown and described with reference to a preferred embodiment, it will be understood by those skilled in the art that various changes in form and detail may be made therein without departing from the spirit and scope of the invention.

What is claimed is:

1. A method for controlling positioning of a graphical pointer displayed on a display of a data processing system having a graphical pointing device, comprising the steps of:

outputting on the display a predefined region having a border;

defining a first relationship that correlates manipulation of the graphical pointing device and movement of the graphical pointer when the graphical pointer is without the predefined region;

defining a second relationship that correlates manipulation of the graphical pointing device and movement of the graphical pointer when the graphical pointer contacts the border of the predefined region; and in response to a manipulation of the graphical pointing device, moving the graphical pointer in accordance with the first relationship when the graphical pointer is displayed without the predefined region while denying access to the predefined region when the graphical pointer contacts the border;

wherein access to the predefined region is denied by controlling the graphical pointer in accordance with the second relationship;

wherein the second relationship specifies a substantially zero displacement of the graphical pointer to thereby trap the graphical pointer in the predefined region.

2. A method for controlling positioning of a graphical pointer displayed on a display of a data processing system having a graphical pointing device, comprising the steps of:

outputting on the display a predefined region having a border;

defining a first relationship that correlates manipulation of the graphical pointing device and movement of the graphical pointer when the graphical pointer is without the predefined region;

defining a second relationship that correlates manipulation of the graphical pointing device and movement of the graphical pointer when the graphical pointer contacts the border of the predefined region; and in response to a manipulation of the graphical pointing device, moving the graphical pointer in accordance with the first relationship when the graphical pointer is displayed without the predefined region while denying access to the predefined region when the graphical pointer contacts the border;

wherein access to the predefined region is denied by controlling the graphical pointer in accordance with the second relationship;

wherein the second relationship specifies an substantially large, forward displacement of the graphical pointer along a path being tracked to thereby drive the graphical pointer over the predefined region.

3. A method for controlling positioning of a graphical pointer displayed on a display of a data processing system having a graphical pointing device, comprising the steps of:

outputting on the display a predefined region having a border;

defining a first relationship that correlates manipulation of the graphical pointing device and movement of the graphical pointer when the graphical pointer is without the predefined region;

defining a second relationship that correlates manipulation of the graphical pointing device and movement of the graphical pointer when the graphical pointer contacts the border of the predefined region; and in response to a manipulation of the graphical pointing device, moving the graphical pointer in accordance with the first relationship when the graphical pointer is displayed without the predefined region while denying access to the predefined region when the graphical pointer contacts the border;

wherein access to the predefined region is denied by controlling the graphical pointer in accordance with the second relationship;

wherein the second relationship specifies a substantially large, rearward displacement of the graphical pointer along a path being tracked to thereby drive the graphical pointer away from the predefined region.

4. A method for controlling positioning of a graphical pointer displayed on a display of a data processing system having a graphical pointing device, comprising the steps of:

outputting on the display a predefined region having a border;

defining a first relationship that correlates manipulation of the graphical pointing device and movement of the graphical pointer when the graphical pointer is without the predefined region;

defining a second relationship that correlates manipulation of the graphical pointing device and movement of the graphical pointer when the graphical pointer contacts the border of the predefined region; and in response to a manipulation of the graphical pointing device, moving the graphical pointer in accordance with the first relationship when the graphical pointer is displayed without the predefined region while denying access to the predefined region when the graphical pointer contacts the border;

wherein access to the predefined region is denied by controlling the graphical pointer in accordance with the second relationship;

wherein the second relationship specifies a substantially large, random displacement of the graphical pointer along a path different from a path being tracked to thereby drive the graphical pointer to a position without the predefined region.

5. A method for controlling positioning of a graphical pointer displayed on a display of a data processing system having a graphical pointing device, comprising the steps of:

outputting on the display a predefined region having a border;

defining a first relationship that correlates manipulation of the graphical pointing device and movement of the graphical pointer when the graphical pointer is without the predefined region;

defining a second relationship that correlates manipulation of the graphical pointing device and movement of the graphical pointer when the graphical pointer contacts the border of the predefined region; and in response to a manipulation of the graphical pointing device, moving the graphical pointer in accordance with the first relationship when the graphical pointer is displayed without the predefined region while denying access to the predefined region when the graphical pointer contacts the border;

wherein access to the predefined region is denied by controlling the graphical pointer in accordance with the second relationship;

wherein the second relationship specifies a substantially large, random displacement of the graphical pointer along a path different from a path being tracked to thereby drive the graphical pointer to a position without the predefined region;

wherein the position is a home position on the display.

6. A computer program product within a computer readable media for causing a data processing system to position a graphical pointer displayed within a display device of a data processing system, said data processing system including a graphical pointing device, said computer program product comprising:

instruction means for outputting on the display a predefined region having a border;

instruction means for defining a first relationship that correlates manipulation of the graphical pointing device and movement of the graphical pointer when the graphical pointer is without the predefined region; and instruction means, responsive to a manipulation of the graphical pointing device, for moving the graphical pointer in accordance with the first relationship when the graphical pointer is displayed without the predefined region while denying the graphical pointer access to an interior of the predefined region when the graphical pointer contacts the border;

wherein the instruction means for moving the graphical pointer includes means for driving the graphical pointer to a position on the display without the widget.

7. A method for controlling positioning of a graphical pointer displayed on a display of a data processing system having a graphical pointing device, comprising the steps of:

outputting a widget on the display;

defining a first relationship that correlates manipulation of the graphical pointing device and movement of the graphical pointer when the graphical pointer is without the widget; and in response to a manipulation of the graphical pointing device by a restricted user, moving the graphical pointer in accordance with the first relationship when the graphical pointer is displayed without the widget while denying the restricted user access to the widget, wherein the restricted user is denied access to the widget by freezing the graphical pointer on the widget.

8. A method for controlling positioning of a graphical pointer displayed on a display of a data processing system having a graphical pointing device, comprising the steps of:

outputting a widget on the display;

defining a first relationship that correlates manipulation of the graphical pointing device and movement of the graphical pointer when the graphical pointer is without the widget; and in response to a manipulation of the graphical pointing device by a restricted user, moving the graphical pointer in accordance with the first relationship when the graphical pointer is displayed without the widget while denying the restricted user access to the widget, wherein the restricted user is denied access to the widget by skipping the graphical pointer over the widget.

9. A method for controlling positioning of a graphical pointer displayed on a display of a data processing system having a graphical pointing device, comprising the steps of:

outputting a widget on the display;

defining a first relationship that correlates manipulation of the graphical pointing device and movement of the graphical pointer when the graphical pointer is without the widget; and in response to a manipulation of the graphical pointing device by a restricted user, moving the graphical pointer in accordance with the first relationship when the graphical pointer is displayed without the widget while denying the restricted user access to the widget wherein the restricted user is denied access to the widget by reversing the graphical pointer away from the widget.

10. A method for controlling positioning of a graphical pointer displayed on a display of a data processing system having a graphical pointing device, comprising the steps of:

outputting a widget on the display;

defining a first relationship that correlates manipulation of the graphical pointing device and movement of the graphical pointer when the graphical pointer is without the widget; and in response to a manipulation of the graphical pointing device by a restricted user, moving the graphical pointer in accordance with the first relationship when the graphical pointer is displayed without the widget while denying the restricted user access to the widget, wherein the restricted user is denied access to the widget by driving the graphical pointer around a border of the widget.

11. A method for controlling positioning of a graphical pointer displayed on a display of a data processing system having a graphical pointing device, comprising the steps of:

outputting a widget on the display;

defining a first relationship that correlates manipulation of the graphical pointing device and movement of the graphical pointer when the graphical pointer is without the widget; and in response to a manipulation of the graphical pointing device by a restricted user, moving the graphical pointer in accordance with the first relationship when the graphical pointer is displayed without the widget while denying the restricted user access to the widget, wherein the restricted user is denied access to the widget by driving the graphical pointer to a position on the display without the widget, wherein the widget is a selectable icon.

12. A computer program product within a computer readable media for causing a data processing system to position a graphical pointer displayed within a display device of a data processing system, said data processing system including a graphical pointing device, said computer program product comprising:

instruction means for outputting on the display a predefined region having a border;

instruction means for defining a first relationship that correlates manipulation of the graphical pointing device and movement of the graphical pointer when the graphical pointer is without the predefined region; and instruction means, responsive to a manipulation of the graphical pointing device, for moving the graphical pointer in accordance with the first relationship when the graphical pointer is displayed without the predefined region while denying the graphical pointer access to an interior of the predefined region when the graphical pointer contacts the border;

wherein the instruction means for moving the graphical pointer include means for freezing the graphical pointer on the widget.

13. A computer program product within a computer readable media for causing a data processing system to position a graphical pointer displayed within a display device of a data processing system, said data processing system including a graphical pointing device, said computer program product comprising:

instruction means for outputting on the display a predefined region having a border;

instruction means for defining a first relationship that correlates manipulation of the graphical pointing device and movement of the graphical pointer when the graphical pointer is without the predefined region; and instruction means, responsive to a manipulation of the graphical pointing device, for moving the graphical pointer in accordance with the first relationship when the graphical pointer is displayed without the predefined region while denying the graphical pointer access to an interior of the predefined region when the graphical pointer contacts the border;

wherein the instruction means for moving the graphical pointer includes means for skipping the graphical pointer over the widget.

14. A computer program product within a computer readable media for causing a data processing system to position a graphical pointer displayed within a display device of a data processing system, said data processing system including a graphical pointing device, said computer program product comprising:

instruction means for outputting on the display a predefined region having a border;

instruction means for defining a first relationship that correlates manipulation of the graphical pointing device and movement of the graphical pointer when the graphical pointer is without the predefined region; and instruction means, responsive to a manipulation of the graphical pointing device, for moving the graphical pointer in accordance with the first relationship when the graphical pointer is displayed without the predefined region while denying the graphical pointer access to an interior of the predefined region when the graphical pointer contacts the border;

wherein the instruction means for moving the graphical pointer includes means for reversing the graphical pointer away from the widget.

15. A computer program product within a computer readable media for causing a data processing system to position a graphical pointer displayed within a display device of a data processing system, said data processing system including a graphical pointing device, said computer program product comprising:

instruction means for outputting on the display a predefined region having a border;

instruction means for defining a first relationship that correlates manipulation of the graphical pointing device and movement of the graphical pointer when the graphical pointer is without the predefined region; and instruction means, responsive to a manipulation of the graphical pointing device, for moving the graphical pointer in accordance with the first relationship when the graphical pointer is displayed without the predefined region while denying the graphical pointer access to an interior of the predefined region when the graphical pointer contacts the border;

wherein the instruction means for moving the graphical pointer includes means for driving the graphical pointer around a border of the widget.

16. The method as described in claim 7, 8, 8, 10 or 11 wherein the widget is a selectable icon.

\* \* \* \* \*

UNITED STATES PATENT AND TRADEMARK OFFICE
CERTIFICATE OF CORRECTION

PATENT NO.   : 5,963,191
DATED        : October 5, 1999
INVENTOR(S)  : William Jaaskelainen, Jr.

It is certified that error appears in the above-identified patent and that said Letters Patent is hereby corrected as shown below:

Column 1,
Line 41, delete "Of" and substitute -- of --.

Column 2,
Line 39, after "widget" insert -- . --.

Column 4,
Line 54, after "skilled" delete "In" and substitute -- in --

Column 6,
Line 13, after "85" delete "Is" and substitute -- is --.

Column 11,
Line 17, after "292" delete "Is" and substitute -- is --.
Line 25, after "286" delete "Is" and substitute -- is --.

Column 17,
Claim 11,
Line 4, delete ", wherein the widget is a selectable icon" and insert -- . --

Claim 16,
Line 47, delete second numerical "8" and substitute -- 9 --.

Signed and Sealed this

Twenty-first Day of August, 2001

*Attest:*

*Attesting Officer*

NICHOLAS P. GODICI
*Acting Director of the United States Patent and Trademark Office*